United States Patent [19]

Zukerman et al.

[11] Patent Number: 6,103,283

[45] Date of Patent: Aug. 15, 2000

[54] PROCESS FOR PRODUCING MILK INFUSED CEREAL GRAIN READY-TO-EAT PRODUCTS

[75] Inventors: Harold W. Zukerman; Rachel B. Zukerman, both of Northbrook, Ill.

[73] Assignee: Healthy Grain Foods LLC., Northbrook, Ill.

[21] Appl. No.: 09/210,822

[22] Filed: Dec. 14, 1998

[51] Int. Cl.[7] .................................. A23L 1/10; A23P 1/02
[52] U.S. Cl. ........................... 426/285; 426/93; 426/618; 426/619; 426/620; 426/453; 426/454; 426/455; 426/456; 426/459; 426/460; 426/512; 426/462
[58] Field of Search ..................................... 426/285, 305, 426/309, 89, 93, 618, 619, 620, 453, 454, 455, 456, 512, 459, 460, 462

[56] References Cited

U.S. PATENT DOCUMENTS

| | | | |
|---|---|---|---|
| 713,581 | 11/1902 | Winton | 426/285 X |
| 903,586 | 11/1908 | Lauhoff | 426/454 X |
| 2,329,402 | 9/1943 | Logue | 426/285 |
| 2,339,418 | 1/1944 | McKay | 426/93 |
| 2,437,150 | 3/1948 | Berg | 426/285 |
| 3,711,295 | 1/1973 | Zukerman | 426/618 |
| 3,733,206 | 5/1973 | Jensen, Jr. | 426/454 |
| 4,764,390 | 8/1988 | Zukerman et al. | 426/618 X |
| 5,137,745 | 8/1992 | Zukerman et al. | 426/618 |
| 5,525,366 | 6/1996 | Zukerman et al. | 426/618 X |
| 5,817,355 | 10/1998 | Zukerman et al. | 426/618 X |

*Primary Examiner*—Milton Cano

[57] ABSTRACT

The present invention relates to a process for producing a ready-to-eat cereal and fluid-milk breakfast food product having a firm surface and an interior comprised of fully cooked, soft and moist, fluid-milk-infused cereal grains joined together. The cereal and fluid-milk products of the present invention can be picked up and eaten hand-held because their textures do not become soggy even when the cereal grains have been infused with all the added fluid-milk. In the process of the present invention, a fluid-milk solution which contains starch complexing agents, flavors and sweeteners, are infused into cereal grains at temperatures above 180 F until the cereal grains become infused with all the fluid-milk solution, fully cooked, and soft and moist in texture. The proteins of the cooked fluid-milk together with the gelatinized starch of the cooked cereal grains provide the needed fluid-binding and cohesive properties which synergistically act together to both cause the individual fully-cooked cereal grains to become joined to one another and in addition, to bind and retain all the infused fluid-milk solution within the cereal grains' interiors. The fluid-milk-infused cereal grains are then shaped into units with low shear forming equipment, and oven-baked to firm their surface texture and develop their golden brown surface color while still retaining their soft, moist, fluid-milk-infused interior texture.

20 Claims, No Drawings

PROCESS FOR PRODUCING MILK INFUSED CEREAL GRAIN READY-TO-EAT PRODUCTS

BACKGROUND OF THE INVENTION

Commercial READY TO EAT (RTE), puffed, dry cereal pieces can be consumed hand-held like a finger-food as long as the cereal pieces remain dry. Whenever commercial, RTE, puffed, dry cereal pieces, like those listed in Table 1, are submerged in refrigerated fluid-milk, the cereal pieces absorb the milk and become so soggy that they can no longer be picked up and consumed hand-held. In addition, when RTE, dry, puffed cereal pieces and fluid-milk are combined in a bowl, there always remains an excess amount of fluid-milk in the bowl because the RTE, dry, puffed cereal pieces have a very small and limited fluid-milk absorption capacity and cannot absorb all the fluid-milk.

The prior art teaches how to make several different very low density commercial RTE puffed, dry cereal pieces (like those listed in Table 1) from processes that include: gun-puffing, oven-puffing, flaking, shredding, and extrusion cooking/expansion. There are two general methods for making puffed, dry, RTE very low-density cereal pieces. In one method, the sudden application of heat at atmospheric pressure vaporizes the cereal's water and puffs the cereal before the water vapor has time to diffuse to the surface of the cereal pieces. In the second method, the cereal, under pressure and containing superheated steam, is transferred suddenly from a higher to a lower pressure which vaporizes the water and puffs the cereal. Both methods depend on water instantaneously changing from liquid to a vapor.

The prior art also teaches how to coat the surfaces of the RTE puffed, dry cereal pieces with glazes or syrups that protect the cereal pieces from fluid-milk absorption by slowing the rate that the fluid-milk absorbs into the puffed and coated cereal pieces. In addition to the individual RTE puffed, dry, cereal pieces that are made to be submerged in fluid-milk and eaten from a bowl with a spoon, the puffed, dry, cereal pieces that are listed in Table 1 are also joined together to make low-density, dry, cereal snacks such as rice cakes, rice crispy bars, and granola bars.

Table 1. A partial list of commercial, RTE, puffed, dry, cereal products listing the "puffng" techniques, product type, company, and the low bulk densities of the cereal pieces:

| Commercial, RTE, Dry, "Puffed" Cereal Products | | Company | Bulk Densities (Grams/Cubic Centimeter) |
|---|---|---|---|
| RICE KRISPIES | Puffed | Kelloggs | 0.0950 |
| CORN FLAKES | Flakes | Kelloggs | 0.1086 |
| WHEATIES | Flakes | General Mills | 0.1526 |
| SPECIAL K | Flakes | Kelloggs | 0.1150 |
| CAP'N CRUNCH | Puffed | Quaker | 0.1396 |
| OREOS O'S | Puffed | Kraft | 0.1410 |
| PUFFED WHEAT | Puffed | Quaker | 0.0524 |
| PUFFED RICE | Puffed | Quaker | 0.0538 |
| COCOA PUFFS | Puffed | General Mills | 0.1498 |
| CHEERIOS | Puffed | General Mills | 0.1130 |
| CHEERIOS HONEY NUT | Puffed | General Mills | 0.1350 |

The prior art also teaches how to make hand-held, dry nutritional bars for sports enthusiasts, children, and the elderly by mixing dry powdered proteins, dry simple and complex carbohydrates, and dry powdered milk, and then compressing the dry mixture of ingredients into bar shapes. There are also bakery products such as breads, sweet rolls, and cakes that use milk-based additives such as whey, non-fat dry milk solids, and whey protein concentrates for protein fortification, color-development, and improved bread volume. The prior art also teaches how rice, other cereal grains, and pasta pieces are cooked in water and/or steam, and how shaped rice and grain products are made from cereal grains that are cooked in water and/or steam.

The present invention relates to a process for producing a cereal and fluid-milk breakfast-food product having a firm surface and an interior comprised of fully- cooked, soft and moist, fluid-milk-infused cereal grains joined together. The cereal and fluid-milk products of the present invention can be picked up and eaten hand-held because their textures are not soggy even when infused with all the added fluid-milk. More specifically, the present invention teaches a process for making hand-held cereal and fluid-milk products, as taught in Example 1, that have a water activity above 0.85, stored frozen, and are reheated before serving, and consumed hand-held; and also other cereal and fluid-milk products, as taught in Example 2, that have a water activity below 0.85, are stored at room temperature, and consumed hand-held.

The products of the present invention are particularly usefull for traveling and busy consumers who want the taste and nutrition of a bowl of whole grain cereal and fluid-milk but don't have the time to sit down at a table, pour the fluid-milk and whole-grain cereal in a bowl and then eat it with a spoon. They want the convenience of eating their whole grain cereal and fluid-milk hand-held while on-the-go, even while driving their car.

BRIEF SUMMARY OF THE INVENTION

The present invention relates to a process for producing ready-to-eat hand-held cereal and fluid-milk breakfast-food products having a firm surface and interiors comprised of soft and moist, fluid-milk-infused cereal grains joined together. The cereal and fluid-milk products of the present invention can be picked up and eaten hand-held because their textures are not soggy even when infused with all the added fluid-milk. The present invention teaches a process for making hand-held cereal and fluid-milk products, as taught in Example 1, that have a water activity above 0.85, are stored frozen, reheated before serving, and consumed hand-held; and also other hand-held cereal and fluid-milk products, as taught in Example 2, that have a water activity below 0.85, are stored at room temperature, and consumed hand-held.

In the process of the present invention, 200–400 lbs. of fluid-milk which can contain a starch-complexing agent such as a blend of monoglycerides and lecithin, flavors, and sweeteners and combinations thereof are infused into each 100 lbs. of cereal grains at temperatures above 180 F until the grains become soft and moist, fully cooked, and infused with all the fluid-milk. The proteins of cooked fluid-milk together with the gelatinized starch of the cooked cereal grains provide the needed fluid-binding, and cohesive properties which synergistically act together to cause the individual fully-cooked, soft and moist cereal grains to become joined to one another, and, in addition, bind and retain all the infused fluid-milk solution within the cereal grains' interiors. The fluid-milk-infused cereal grains are then formed into shaped units with low shear forming equipment. The shaped units are then oven-baked. The baking step firms the texture of the units' surface, develops its golden brown surface color, and retains its soft, moist, fluid-milk-infused interior texture. With the process of the present invention, all the infused fluid-milk solution is retained within the grains' interior without becoming soggy.

It is an object of the present invention to provide a process for producing hand-held, hot cereal and fluid-milk food products having a firm surface and interiors comprised of fully-cooked, soft and moist, fluid-milk-infused cereal grains joined together; said cereal and milk products are stored frozen, reheated before serving, and consumed hand-held.

It is another object of the present invention to provide a process for producing room-temperature-stored hand-held, cereal and fluid-milk food products having a firm surface and interiors comprised of fully-cooked, soft and moist, fluid-milk-infused cereal grains joined together.

DETAILED DESCRIPTION OF THE PREFERRED EMBODIMENT

The present invention relates to a process for producing hand-held cereal and fluid-milk food products having firm surfaces and interiors comprised of fully-cooked, soft and moist, fluid-milk-infused cereal grains joined together. More specifically, the present invention teaches a process for making both hand-held cereal and fluid-milk products, as taught in Example 1, that have a water activity higher than 0.85, and are stored frozen, reheated before serving, and consumed hand-held; and also other hand-held cereal and fluid-milk products like those taught in Example 2, that have a water-activity lower than 0.85, and are stored at room temperature and consumed hand-held.

The hand-held cereal and fluid-milk food products taught in Examples 1 and 2 are made by the following three-step process. In the first step, flavored fluid-milk is infused into cereal grains. In the second step, the fluid-milk-infused cereal grains are formed into shaped units with low-shear forming equipment. In the third step, the units are heated by oven-baking or fat-frying to firm the texture of the units' surfaces, develop their golden brown color, and retain their fully-cooked, soft and moist, fluid-milk-infused interiors.

To more simply describe the present invention, we refer to it as hand-held, cereal and fluid-milk breakfast foods. However, it is to be understood that the products of the present invention have shapes like French-fried potatoes or cereal bars or other shaped units that can be picked-up and consumed hand-held. Also, the products of the present invention have firm surfaces and interiors comprised of soft and moist, fluid-milk-infused cereal grains that are joined together.

In the first step of the process, the cereal grains are infused with fluid-milk at temperatures above 180 F. The fluid-milk that is infused into the cereal grains can be obtained either from cows or goats and is selected from the group consisting of: regular fluid-milk, low-fat fluid-milk, fluid-milk with the fat removed, regular strength fluid-milk diluted with water, concentrated milk, powdered milk whey, powdered milk proteins, condensed milk, fluid-milk made by adding water to dry milk solids, or combinations thereof. It is preferred to use low-fat milk or fluid milk without any milk fat because during the fluid-milk-infusion of the grains, the cereal grains' starch is complexed and extra fat can reduce the efficiency of the starch complexing reaction. If butter fat, cream or vegetable oil is needed for flavor or lubricity, it is preferred to add them toward the end of the infusion step when most of the starch has already been complexed.

To be more specific, the fluid-milk infusion can be accomplished in either a continuous steam-jacketed or steam-injection cooker equipped with scraper agitators or in a stationary tilt-type steam-jacketed kettle. Both types of equipment are well known in the art and readily available in the market. Also, the grains can be infused with fluid-milk at atmospheric pressure or at higher pressures. In the process of the present invention, the fluid-milk is first heated to about 150 F. If desired, a starch-complexing agent, such as a 1 lb. blend of monoglycerides and lecithin and/or oil where the monoglycerides are about 85% of the blend, is added to and then agitated and uniformly dispersed in the hot fluid-milk. Starch-complexing agents are used to complex the amylose of the cereal grains' starch while the fluid-milk cooks and is infused into the grains. Other starch-complexing agents such as calcium, stearoyl-2-lactylate, sodium stearoyl-fumarate, sucrose fatty acids and succinylate monoglycerides can also be used to complex the amylose.

Sweeteners and flavors can also be added to the fluid-milk before it is infused into the cereal grains to provide flavor, humectancy, sweetness, and added soluble solids to the cereal grains. Sucrose is the preferred sweetener. However, high fructose corn syrup, corn syrup, dextrose, molasses, malto-dextrins, honey, malt syrups, the milks' sugar lactose, and brown sugar can also be used to flavor the cereal and milk product.

Flavors, such as vanilla, chocolate, malt, fruit and/or other flavors can also be added to and dissolved in the fluid-milk solution. When all the sugar, flavors, and starch-complexing agent are dispersed and dissolved in the fluid-milk solution, said solution is heated to temperatures above 180 F. The cereal grains are then added to the fluid-milk solution and gently agitated with low or no-shear agitators and kettle scrapers. The fluid-milk-infusion step is completed when all the fluid-milk solution has been infused into the cereal grains. In addition to the flavor, fruit particles or other food particles can also be added to the fluid-milk solution. They are added towards the end of the fluid-milk-infusion step and distributed together with the milk-infused grains just before the infused cereal grains are discharged from the kettles.

The term "cereal grains" is used herein, including the claims, to refer to both whole cereal grains and modified cereal grains. The following cereal grains have been found to be particularly useful in the practice of this invention, singularly or in a blend, as whole cereal grains and/or as modified cereal grains: white rice, brown rice, wheat, corn, oats, barley, and rye.

If the cereal grains from two or more different grain genera (like that taught in Example 2) are in the same product, all the grains are mixed together and simultaneously infused with the fluid-milk solution. This simultaneous fluid-milk-infusion operation can be accomplished by first modifying the cereal grains so all the modified grains from the different grain genera will require about the same amount of time to become fully-cooked and infused with the fluid-milk solution. The term "modified grains" is used herein, including the claims, to refer to whole cereal grains that are altered by either breaking or cutting the grains in half or into small pieces with a steel cutter, sub-dividing the cereal grains into coarse powders or flattening the grains into thick flakes with rollers.

When the fluid-milk is infused into the cereal grains, the amylose of the grains' starch is at the same time complexed with the starch-complexing agent. In addition, the hot fluid-milk also cooks the grains as the fluid-milk is infused into them. The infusion and cooking continues until said grains become fully-cooked. The term "fully cooked" is used herein, including the claims, to designate a cooked state in which substantially all of the starch granules of the soft and moist grains are completely gelatinized but not swollen or ruptured.

The cohesiveness of the fully-cooked cereal grains' surfaces is in part influenced by the combination of the proteins of the cooked fluid-milk and the cereal grains' gelatinized soluble starch which was leached from the grains during the fluid-milk-infusion operation. Both the heated fluid-milks' proteins and the gelatinized cereal grains' starch become coated onto the cereal grains' surfaces as the fluid-milk is infused into the cereal grains, and their cohesive properties enable the cereal grains to become joined to one another. The proteins of the cooked fluid-milk together with the gelatinized starch of the cereal grains also provide fluid-binding properties which synergistically act together to bind and retain all the infused fluid-milk solution within the cereal grains' interiors.

When shelf-stable, room temperature-stored, cereal and fluid-milk products are produced, as taught in Example 2, the sweeteners are added to the fluid-milk to provide not only sweetness but soluble solids that are needed to help reduce the products' water activity. Sucrose is the preferred sweetener. However, sorbitol, high fructose corn syrup, corn syrup, dextrose, molasses, malto-dextrins, honey, malt syrups, the milks' sugar lactose, and brown sugar can also be used. In addition to the soluble solids, antimycotic agents such as sorbic acid, benzoic acid or their salts can also be added. Starch-complexing agents such as monoglycerides can also be added to the fluid-milk before it is infused into the cereal grains. The fluid-milk solution, at temperatures above 180 F, and comprised of the added sweeteners, soluble solids, antimycotic agent, and starch complexing agent are then infused into the cereal grains at the rate of about 2 to 4 times the dry weight of said grains.

In the second step of the process, the fluid-milk-infused cereal grains are formed into shaped units with low shear formers. Several systems were found to be useful in forming the shapes of the cereal and milk units. In one shaping system, the fluid-milk infused grains are extruded into continuous, fluid-milk-infused grain ribbons with a large diameter Double Roll Former equipped with a TEFLON (polytetra fluoroethylen) coated die plate; said Former gently extrudes said grains with minimum pressure and shear. The holes in the discharge die plate determine the products shape. Rectangular shaped grain units are made with rectangular shaped die holes. The extruded fluid-milk infused grain ribbons are then cut into units with a knife blade such as a guillotine cutter.

In another forming system, the fluid-milk-infused grains are formed into three dimensional shapes by pressing said grains with a die and a mold wherein the shape of the mold forms the units' two dimensional shape, and the die, which is fabricated or coated with a non-stick material to prevent the sticky grains from attaching to the equipment, creates the three dimensional shape. This system is used primarily to make circular, oval, and cup-shaped units. When this shaping system is used, fat, starch-complexing agents and lecithin should also be added to the fluid-milk to provide lubrication and prevent the fluid-milk-infused grains from sticking to the die and mold-forming equipment.

In another shaping system, the fluid-milk-infused grains are formed into shaped units by extruding or depositing, with low shear formers, said grains into a continuous grain sheet, adjusting the height of the grain sheet, and then cutting said grain sheet into shaped units with rotary and guillotine cutters.

In the third step of the process, the formed units are heated to firm the texture of their surfaces, develop their surface color and retain their soft, moist, fluid-milk-infused interiors. The heating step also cooks and gelatinizes the starch in the grains' centers to assure that all of the starch granules of the fluid-milk-infused cereal grains are fully-cooked. Oven-baking is the preferred heating technique. However, as an option, the units can also be fat-fried to firm the units surface, develop their surface color, and retain their soft, moist, fluid-milk infused interiors.

The present invention teaches a process for producing both hand-held, cereal and milk products that have a water activity above 0.85 and also hand held cereal and milk products that have water activities below 0.85. In a preferred embodiment, the cereal and milk products having a water activity above 0.85 after the oven-baking or fat-frying heating step is completed are rapidly frozen and stored frozen. Freezing can be done with either cold air, liquid nitrogen, or liquid carbon dioxide. The freezers and process for freezing the units are well known in the art and are commercially available.

The following two examples describe the process for making hand-held cereal and fluid-milk products having a firm surface and interiors comprised of fully-cooked, soft and moist, fluid-milk-infused cereal grains.

Example 1 teaches a process and formula for making hand-held cereal and fluid-milk products that have water activities above 0.85, are stored frozen, reheated before serving, and consumed hand-held. The formula and process illustrate the invention, but it is not intended that the invention be limited to the details set forth therein:

| EXAMPLE 1: HOT CEREAL AND MILK TO-GO | |
| --- | --- |
| INGREDIENTS | PERCENT |
| Fluid Milk | 70.00 |
| White Rice | 20.00 |
| Sucrose | 3.00 |
| Light Brown Sugar | 3.00 |
| Flavor | 3.00 |
| Salt | 0.75 |
| Starch Complexing Agent | 0.25 |
| Total: | 100.00 |

In Example 1, the fluid-milk is prepared by dissolving non-fat dry milk solids in water and heating the fluid-milk to approximately 150 F. Then, a mixture of the starch complexing agent, monoglycerides and lecithin are added to and uniformly dispersed into the fluid-milk. A pre-blend of the sugar, salt, and flavor is then also added to and dissolved in the fluid-milk solution which is then heated to about 200 F and transferred to a tilt type, steam-jacketed kettle equipped with scraper-type agitators. The dry, raw white rice is added, and with gentle agitation, dispersed into the flavored, fluid-milk solution. The entire fluid-milk solution, at about 200 F, is then infused into the rice grains over approximately 20 to 30 minute period of time. The milk-infused rice grains are then dumped from the tilt kettle and extruded into continuous rectangular shaped rice ribbons with a low shear Double Roll Former having a die plate equipped with square holes. The rice ribbons are then cut into about two to four inch long pieces with cutters. The units, comprised of fully-cooked fluid-milk-infused rice grains, are then oven-baked at about 400 F for about 15 minutes. The product taught in Example 1 has a water activity above 0.85 and is frozen and stored frozen.

Example 2 teaches a process for making hand-held, shelf-stable, room-temperature-stored, cereal and fluid-milk products having a water activity below 0.85. The formula and process illustrate the invention, but it is not intended that the invention be limited to the details set forth therein:

| EXAMPLE 2: SHELF-STABLE, CEREAL AND MILK TO- GO | |
|---|---|
| INGREDIENTS | PERCENT |
| Fluid Milk | 60.00 |
| Water | 10.00 |
| White Rice | 7.00 |
| Steel Cut Oats | 6.50 |
| Wheat Flakes | 6.00 |
| Sucrose | 5.00 |
| Brown Sugar | 3.00 |
| Flavor | 1.30 |
| Salt | 0.75 |
| Starch Complexing Agent | 0.25 |
| Sorbic Acid | 0.20 |
| Total: | 100.00 |

In Example 2, full fat, refrigerated fluid-milk is heated to 150 F. A starch-complexing agent, is added and uniformly dispersed in the-fluid milk. When shelf-stable, room-temperature-stored products are made, sweeteners have to be added to the fluid-milk to provide soluble solids to the fluid-milk. Soluble solids, together with the fluid-milks' moisture loss that occurs when the units are heated by oven-baking, reduce said oven-baked units' water activity to below 0.85. In addition to the sweeteners, salt and an antimycotic agent such as sorbic acid are also added to the fluid-milk solution. The fluid-milk solution is then heated to about 200 F before said solution is infused into the cereal grains.

A pre-blend of three modified cereal grains: oats, wheat and rice are, with gentle agitation, dispersed in the fluid-milk solution. These grains had been previously modified in a manner so that all three grain genera would become fully-cooked and infused with the fluid-milk solution during the same time period. The fluid-milk-infusion is accomplished while the amylose starch of the grains is complexed with the starch-complexing agent. The grains become fully-cooked at the end of the fluid-milk-infusion step. The milk-infused grains are then dumped from the tilt kettle and deposited into a uniform continuous grain sheet on a belt conveyor. Said grain sheets' height is then adjusted to about a one-half inch thickness. The continuous grain sheet is then cut into approximately two to four inch long cereal bar units with rotary and guillotine cutters.

When shelf-stable, room-temperature-stored products like those taught in Example 2 are produced, the units are usually heated in a convection oven until their water-activity is reduced to below 0.85. During the heating step the units' golden brown surface color develops, their surface texture firms, and their soft-moist fluid-milk-infused interior texture is retained. Also during the oven-baking step, the proteins of the cooked fluid-milk together with the gelatinized starch of the fully-cooked soft and moist cereal grains provide the fluid binding properties that help bind and retain all the infused fluid-milk solution within the cereal grains' interiors and allow said units to have a soft and moist, fluid-milk-infused interior texture.

It is understood that the above described process and the above examples are simply illustrative of the application of principles of the invention and many other modifications may be made without departing from the spirit and scope of the invention.

The embodiments of the invention in which an exclusive property or privilege is claimed are defamed as follows:

We claim:

1. A process for making a cereal and fluid-milk food product having a firm surface and an interior comprised of fully-cooked, fluid-milk-infused, soft and moist cereal grains joined together, said process comprising the steps of:
   (a) infusing fluid-milk into cereal grains at temperatures above 180 F until said grains become filly-cooked and infused with said fluid-milk;
   (b) forming said fluid-milk-infused cereal grains into shaped units with low shear formers; and
   (c) heating the units of b) to firm their surfaces, develop said units surface color, and retain said units soft and moist, fluid-milk-infused cereal grain interior.

2. The process of claim 1 wherein the cereal grains are selected from the group consisting of: white rice, brown rice, wheat, corn, oats, barley, rye, and combinations thereof.

3. The process of claim 2 wherein cereal grains selected from two or more different grain genera are modified so said grains can become fully cooked and infused with fluid-milk under the same conditions and during the same time period.

4. The process set forth in claim 1 wherein the amount of fluid-milk-infused into the cereal grains is from 2 to 4 times the dry weight of said grains.

5. The process set forth in claim 1 wherein the fluid-milk which is infused into the cereal grains is selected from the group consisting of: regular fluid-milk, low-fat fluid-milk, fluid-milk with the fat removed, regular strength fluid-milk diluted with water, concentrated milk, powdered milk whey, powdered milk proteins, condensed milk, fluid-milk made by adding water to dry milk solids, or combinations thereof.

6. The process set forth in claim 1 wherein a starch-complexing agent is added to the fluid-milk, said complexing agent is selected from the group consisting of monoglycerides, calcium, stearoyl-2-lactylate, sodium stearoyl-fumarate, sucrose fatty acids, and succinylate monoglycerides.

7. The process set forth in claim 1 wherein sweeteners and flavors are added to the fluid-milk before said fluid-milk is infused into the cereal grains.

8. The process of claim 1 wherein the fluid-milk infused grains are formed into shaped units by extruding continuous ribbons of fluid-milk-infused grains with a low shear Double Roll Former and then cutting said fluid-milk-infused grain ribbons into units.

9. The process of claim 1 wherein the fluid-milk-infused grains are formed into shaped units by depositing said grains with low-shear depositing equipment into a continuous sheet comprised of fluid-milk-infused grains, adjusting the thickness of said sheet and then cutting said sheet into units with rotary and guillotine cutters.

10. The process of claim 1 wherein the fluid-milk-infused cereal grains are formed into shaped units by pressing said fluid-milk-infused grains with a die and a mold.

11. The process of claim 1 wherein the shaped units comprised of fluid-milk-infused cereal grains are heated by oven-baking.

12. The process of claim 1 wherein the shaped units comprised of fluid-milk-infused cereal grains are heated by fat-frying.

13. The process of claim 1 which further comprises the step of rapidly freezing the heated units that have water-activities higher than 0.85.

14. A process for making a shelf-stable cereal and fluid-milk food product having a firm surface, an interior comprised of fully-cooked, fluid-milk-infused, soft and moist cereal grains joined together, and a water activity lower than 0.85, said process comprising the steps of:

(a) infusing a solution comprised of fluid-milk and sweeteners into cereal grains at temperatures above 180 F, until said grains become fully-cooked and infused with said sweetened, fluid-milk solution;

(b) forming said fully-cooked, sweetened, fluid-milk-infused cereal grains into shaped units with low-shear formers; and (c) heating the units of b) until their water activity is below 0.85, their surfaces become firm, and their interiors remain soft and moist.

15. The process set forth in claim 14 wherein the fluid-milk which is infused into the cereal grains is selected from the group consisting of: regular fluid-milk, low-fat fluid-milk, fluid-milk with the fat removed, regular strength fluid-milk diluted with water, concentrated milk, milk whey, milk proteins, condensed milk, fluid-milk made by adding water to dry milk solids, or combinations thereof.

16. The process set forth in claim 14 wherein sweeteners, which are added to the fluid-milk before it is infused into the cereal grains, are selected from the group consisting of sucrose, sorbitol, high fructose corn syrup, corn syrup, dextrose, molasses, malto-dextrins, honey, malt syrups, lactose, brown sugar or combinations thereof.

17. The process set forth in claim 14 wherein an antimycotic agent is added to the sweetened fluid-milk solution before said solution is infused into the cereal grains.

18. The process set forth in claim 14 wherein the amount of fluid-milk solution infused into the cereal grains is from 2 to 4 times the dry weight of said grains.

19. The process of claim 14 wherein the fluid-milk-infused cereal grains are formed into shaped units with low shear forming equipment.

20. The process of claim 14 wherein the shaped units are heated with a hot air convection oven.

* * * * *